US009542434B2

(12) United States Patent
Gomadam et al.

(10) Patent No.: US 9,542,434 B2
(45) Date of Patent: *Jan. 10, 2017

(54) DATA ENRICHMENT USING HETEROGENEOUS SOURCES

(71) Applicant: Accenture Global Services Limited, Dublin (IE)

(72) Inventors: Karthik Gomadam, San Jose, CA (US); Peter Z. Yeh, San Jose, CA (US); Kunal Verma, Sunnyvale, CA (US); Harsha Kumar Srivatsa, Fremont, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/553,180

(22) Filed: Nov. 25, 2014

(65) Prior Publication Data

US 2015/0088836 A1 Mar. 26, 2015

Related U.S. Application Data

(63) Continuation of application No. 13/215,741, filed on Aug. 23, 2011, now Pat. No. 8,924,407.

(51) Int. Cl.
*G06F 17/30* (2006.01)
(52) U.S. Cl.
CPC ... *G06F 17/30371* (2013.01); *G06F 17/30303* (2013.01); *Y10S 707/921* (2013.01)

(58) Field of Classification Search
USPC ........ 707/610, 640, 674, 758, 759, 802, 821
See application file for complete search history.

(56) References Cited

U.S. PATENT DOCUMENTS

| 7,376,680 | B1 | 5/2008 | Kettler et al. | |
| 7,743,019 | B2* | 6/2010 | Shah et al. | 707/610 |
| 8,122,042 | B2* | 2/2012 | Pan et al. | 707/759 |
| 8,238,696 | B2* | 8/2012 | Dart et al. | 382/305 |
| 2004/0243588 | A1 | 12/2004 | Tanner et al. | |
| 2008/0319829 | A1* | 12/2008 | Hunt et al. | 705/10 |
| 2009/0006156 | A1* | 1/2009 | Hunt | G06Q 30/02 705/7.11 |
| 2010/0303412 | A1 | 12/2010 | Okuno et al. | |
| 2011/0099193 | A1 | 4/2011 | Jenson | |

OTHER PUBLICATIONS

European Search Report for European Application No. 12005954.8-1527, European Patent Office, Dec. 6, 2012.

* cited by examiner

*Primary Examiner* — Sana Al Hashemi
(74) *Attorney, Agent, or Firm* — Mannava & Kang, P.C.

(57) ABSTRACT

A data enrichment system may include an attribute relevance module to measure relevance of an attribute to a data object to be enriched. The data object may include the attribute including a known or an unknown value. An output value confidence module may calculate a confidence of an output value of a source used for enrichment of the data object. The output value may represent the known and/or unknown values of the attribute. The system may use the measured relevance of the attribute and the calculated confidence of the output value to determine assignment of the known or unknown values to the attribute.

20 Claims, 3 Drawing Sheets

DATA ENRICHMENT USING HETEROGENEOUS SOURCES

PRIORITY

This application is a Continuation of commonly assigned and copending U.S. patent application Ser. No. 13/215,741, filed Aug. 23, 2011, and entitled "DATA ENRICHMENT USING HETEROGENEOUS SOURCES", which is incorporated by reference in its entirety.

BACKGROUND

Data enrichment may be used to determine, for example, missing or additional information for a data object, or the accuracy of information associated with a data object. For example, a data object may be a customer or a product. An example of enrichment of a data object may include, for example, determining an e-mail contact or city of residence for a particular customer. The data object may be enriched manually, for example, by searching sources and subjectively determining, for example, if the information in the sources can be used or is pertinent to the data object. Due to factors such as, for example, the large number of data objects that may need enrichment and the subjectivity of manual enrichment processes, such data enrichment techniques can generate erroneous results. If the enrichment process is automated by obtaining information from a source, changes in the content or format of the source may require modification of the enrichment process. Moreover, if multiple sources are available for enrichment, selection of a particular source can add subjectivity to the enrichment process.

BRIEF DESCRIPTION OF DRAWINGS

The embodiments are described with reference to the following figures.

DETAILED DESCRIPTION OF EMBODIMENTS

Figure 1:
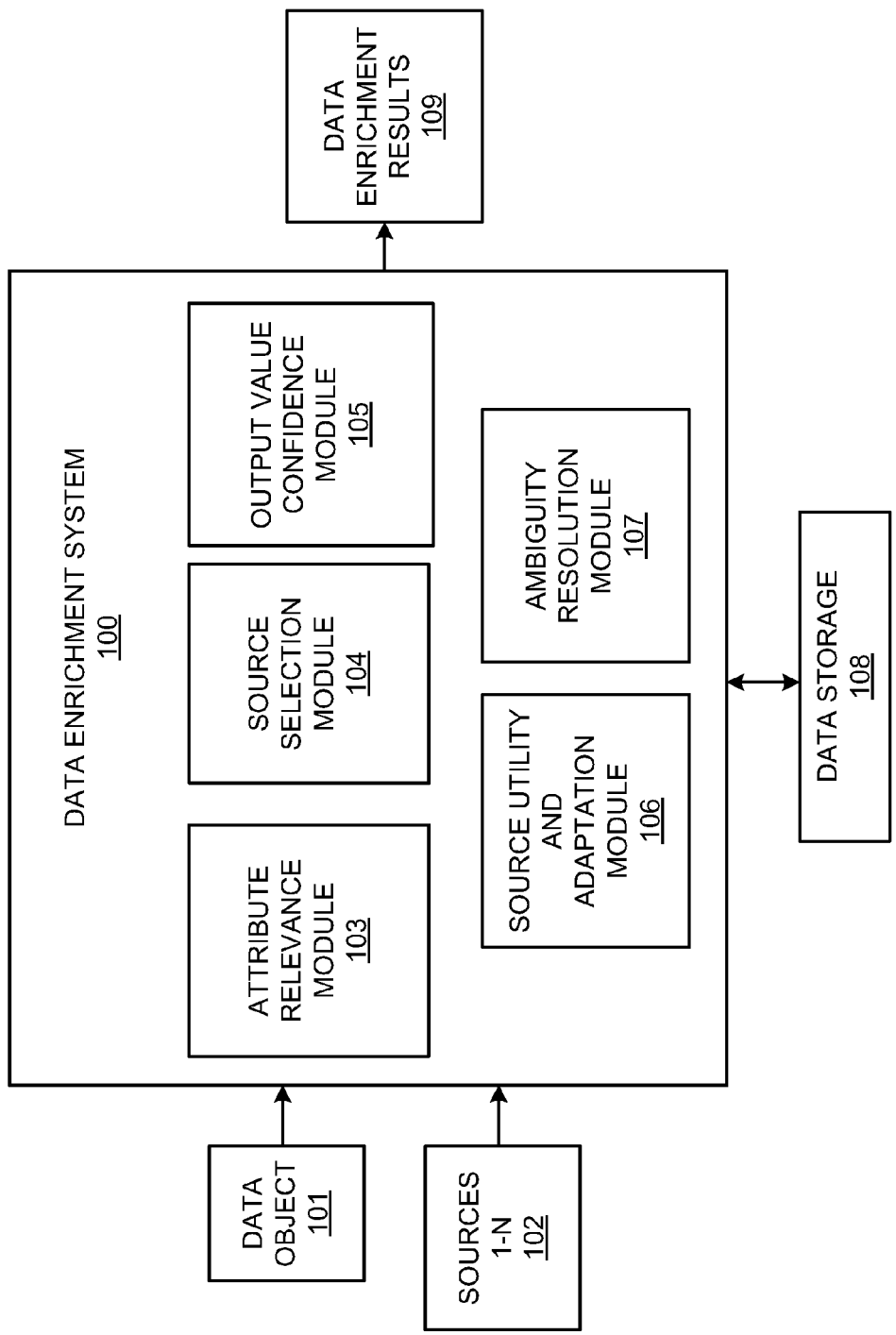
FIG. 1 illustrates a system diagram for a data enrichment system, according to an embodiment.

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

Data enrichment may be used to determine, for example, missing or additional information for a data object, or the accuracy of information associated with a data object. A data object may include known and unknown elements. The known elements may include attributes whose values are known, and the unknown elements may include attributes whose values are unknown. For example, for a data object being a product or a customer, examples of attributes for the customer data object may include address, name, city, state, zip code, e-mail contact and phone number. Of these attributes, if the values of address, name, e-mail contact and phone number are known, these attributes may be denoted known elements. For the unknown attributes city, state and zip code, these attributes may be denoted unknown elements. In order to objectively determine the unknown elements (e.g., the unknown attributes city, state and zip code for the foregoing example), a data enrichment system is provided for automatic enrichment of a wide range of data objects. The data enrichment system may use heterogeneous sources (e.g., structured, unstructured, internal and/or external data sources).

As described in detail below, the data enrichment system may include an attribute relevance module to measure the relevance of an attribute to a data object, and may use the relevance to guide selection of appropriate sources for enrichment by a source selection module. The modules and other components of the data enrichment system may include machine readable instructions, hardware or a combination of machine readable instructions and hardware. The relevance of an attribute may be based on a first premise that an attribute has high relevance to a data object if it is uniquely associated with the data object, and a second premise that an attribute has high relevance if it is highly discriminative with respect to instances of the data object. For the source selection module, selection of the best source to use next may consider, for example, the following two factors. First, selection of the best source may determine whether the source will be able to provide values if called, and secondly, whether the source may target unknown attributes with high relevance. The source selection module may satisfy the first factor by measuring how well known values of a data object match the inputs required by the source. The source selection module may satisfy the second factor by measuring how many high-relevance, unknown attributes the source claims to provide.

An output value confidence module may calculate the confidence in an output value given by a source for an unknown attribute. For example, if a source provides multiple outputs for an input, the output value confidence module may determine the confidence of an output.

A source utility and adaptation module may determine the utility of a source that has been called in enriching the data object of interest. The source utility and adaptation module may model the utility of a source as a "contract". For example, if the source utility and adaptation module provides a source with high confidence input values, then the source may be expected to provide values for all the output attributes that the source claims to target. If these expectations are violated, then the source may be penalized. On the other hand, if the source utility and adaptation module does not provide a source with good inputs, then the source may be penalized minimally, if at all, if the source fails to provide any useful outputs.

An ambiguity resolution module may resolve any ambiguities that may occur during the enrichment process, for example, when a source returns multiple values for an unknown attribute. As described below, in order to resolve an ambiguity, the ambiguity resolution module may branch the original object, for example, one branch for each returned value, and each branched object may be subsequently enriched by the data enrichment system. Hence, a single data object may result in multiple objects at the conclusion of the enrichment process. The ambiguity resolution module may then determine the fitness for each resulting object and return a predetermined number of objects (e.g., top 3 out of 5 total objects returned) according to the fitness.

The data enrichment system may provide for end-users with the ability to, for example, create new data objects and add additional sources. The system may automatically determine and select the best sequence of sources to enrich a data object. The system may automatically adapt the confidence in a source based on the utility of the source output. The system may automatically determine the relevance of an attribute to a data object, and adapt this relevance over time. The system may provide for automated inference to deduce additional information about a data object, which may not be explicitly provided by any sources. The system may also resolve ambiguity during the enrichment process.

The data enrichment system may thus include an attribute relevance module to measure relevance of an attribute to a data object to be enriched. The data object may include the attribute including a known or an unknown value. An output value confidence module may calculate a confidence of an output value of a source used for enrichment of the data object. The output value may represent the known and/or unknown values of the attribute. The system may use the measured relevance of the attribute and the calculated confidence of the output value to determine assignment of the known or unknown values to the attribute. The relevance of the attribute may include a determination of if the attribute is uniquely associated with the data object, and/or a determination of if the attribute is discriminative with respect to instances of the data object. The confidence in the output value of the source may include corroboration of the output value with output values of other sources. A source selection module may select the source for enrichment of the data object from a plurality of sources. The source selection module may determine if the selected source can provide a value for the attribute, and/or if the selected source targets unknown attributes of the data object with high relevance. A source utility and adaptation module may determine utility of the source for enrichment of the data object. The determination of the utility of the source may include a determination of the confidence of input values provided to the source. An ambiguity resolution module may resolve ambiguities in a plurality of output values of the source used for enrichment of the data object. The ambiguity resolution module may generate a plurality of enriched data objects based on each output value of the source.

A method for data enrichment may include measuring relevance of an attribute to a data object to be enriched. The data object may include the attribute including a known or an unknown value. The method may include calculating a confidence of an output value of a source used for enrichment of the data object. The output value may represent the known and/or unknown values of the attribute. The method may further include using the measured relevance of the attribute and the calculated confidence of the output value to determine assignment of the known or unknown values to the attribute. Measuring relevance of the attribute may further include determining if the attribute is uniquely associated with the data object, and/or determining if the attribute is discriminative with respect to instances of the data object. Calculating the confidence of the output value may further include corroborating the output value with output values of other sources. The method may further include selecting the source for enrichment of the data object from a plurality of sources. Selecting the source for enrichment may further include determining if the selected source can provide a value for the attribute, and/or determining if the selected source targets unknown attributes of the data object with high relevance. The method may further include determining utility of the source for enrichment of the data object. Determining utility of the source may further include determining the confidence of input values provided to the source. The method may also include resolving ambiguities in a plurality of output values of the source used for enrichment of the data object.

A non-transitory computer readable medium having stored thereon a computer executable program to provide data enrichment, the computer executable program when executed may cause a computer system to measure relevance of an attribute to a data object to be enriched. The data object may include the attribute including a known or an unknown value. The computer executable program when executed may further cause the computer system to calculate a confidence of an output value of a source used for enrichment of the data object. The output value may represent the known and/or unknown values of the attribute. The computer executable program when executed may further cause the computer system to use the measured relevance of the attribute and the calculated confidence of the output value to determine assignment of the known or unknown values to the attribute.

As described in detail below, the data enrichment system may reduce the effort and cost associated with enriching, for example, enterprise data. The system may improve data quality by improving the completeness of data. The system may also provide more accurate analytics (e.g., fraud detection, customer segmentation, etc.) by enriching existing data models with additional, relevant attributes (e.g., hobbies, life events, etc).

The systems and methods described herein provide a technical solution to the technical problem of data enrichment using heterogeneous sources such as, for example, enterprise databases, structured and unstructured resources on the Web, and file systems. In many instances, manual data enrichment is not a viable solution given the number of data objects, number of sources and variability involved in manual enrichment, which can lead to inconsistent results. The systems and methods according to the embodiments provide the technical solution of objective data enrichment, for example, by automatic determination and selection of the best sequence of sources to enrich a data object, adaptation of the confidence in a source, determination of the relevance of an attribute to a data object, determination of additional information about a data object, and ambiguity resolution.

FIG. 1 illustrates a data enrichment system 100, according to an embodiment. Referring to FIG. 1, the system 100 may expand a data object 101 using information pertinent to the data object across heterogeneous sources 102. The sources 102 may include sources such as, for example, enterprise databases, structured and unstructured resources on the Web, and file systems. An attribute relevance module 103 may measure of the relevance of an attribute to a data object, and may use the relevance to guide the selection of appropriate sources for enrichment by a source selection module 104. An output value confidence module 105 may calculate the confidence in an output value given by a source for an unknown attribute. A source utility and adaptation module 106 may determine the utility of a source that has been called in enriching the data object of interest. An ambiguity resolution module 107 may resolve any ambiguities that may occur during the enrichment process, for example, when a source returns multiple values for an unknown attribute. A data storage 108 may be provided for storing information utilized by the system 100. Results generated by the modules 103-107 may be generated by the system 100 as data enrichment results 109.

Referring to FIG. 1, the data object 101, also denoted data object D, to be enriched may include elements $D_k$ and $D_u$. $D_k$ may include attributes whose values are known, which may be defined as $D_k=\{<a, v(a), k_a, k_{v(a)}> \ldots \}$, where the attribute may be denoted a, the value of the attribute may be denoted v(a), the relevance of the attribute a to $D_k$ may be denoted $k_a$, and the confidence in the correctness of the value v(a) may be denoted $k_{v(a)}$. $D_u$ may include attributes whose values are unknown and hence the targets for enrichment by the system 100. $D_u$ may be defined as $D_u=\{<a, k_a> \ldots \}$. For example, for a data object D being a customer, examples of attributes a may include address, name, city, state, zip code, e-mail contact and phone number. If the attributes address, name, e-mail contact and phone number are known, these attributes may be denoted $D_k$. For the unknown attributes city, state and zip code, these attributes may be denoted $D_u$.

Based on the foregoing aspects of the data object 101, the attribute relevance module 103 may measure the relevance of an attribute to the data object 101. The relevance may be used to guide the selection of appropriate sources 102, also designated sources 1-N, for enrichment. The relevance of an attribute may be based on a first premise that an attribute has high relevance to a data object if it is uniquely associated with the data object, and a second premise that an attribute has high relevance if it is highly discriminative with respect to instances of the data object. For example, for a data object D being a customer, the attribute e-mail contact may have high relevance because it satisfies the two premises above. However, the attribute zip code may have lower relevance to the data object customer because it does not satisfy the second premise (i.e., many customers may map to the same zip code).

The attribute relevance module 103 may determine the foregoing premise by the following equations:

$$k_a = \frac{1}{1+e^{-(H_T(a)+1)(P'_a-P_a)}} \quad (1)$$

where, $$H_T(a) = -\sum_{v \in a} P_v \log P_v \quad (2)$$

In Equation (1), $k_a$ may represent the relevance of an attribute, and may range from 0 to 1, with 1 representing high relevance and 0 representing no relevance. $P_a'$ may represent a relative frequency (e.g., percentage) of data objects that do not have the attribute a (in the set of all data objects defined in the system 100) and $P_a$ may represent the relative frequency (e.g., percentage) of data objects that have the attribute a. For example, for ten data objects under consideration, for an attribute related to e-mail contact, if only one data object has the e-mail contact attribute, then $P_a$ would be 1/10 and $P_a'$ would be 9/10. With regard to the foregoing first premise related to whether an attribute is uniquely associated with a data object, the calculations related to $P_a$ and $P_a'$ may map to this premise. In Equation (2), regarding the foregoing second premise, $H_T(a)$ may represent the entropy of the past T values of the attribute a, and may serve as a proxy for the uniqueness of the values of the attribute a (and hence how discriminative is the attribute a). Since $H_T(a)$ may be recomputed for every T values, relevance of the attribute a may also be adapted over time. For example, for a data object D being a customer, an e-mail contact attribute that has unique values may thus be assigned a higher score $H_T(a)$, versus an attribute of gender, which is not unique and may thus be assigned a lower score. With regard to recomputing of $H_T(a)$ for every T values, this aspect takes into consideration that the value of an attribute may change over time. Thus depending on if T is large or small, $H_T(a)$ may represent the entropy (e.g., the uncertainty) of the past T values of the attribute a. The value of $H_T(a)$ may thus increase or decrease based on a respective increase or decrease in the number of unique values of an attribute a. $P_V$ may represent the relative frequency of a value for an attribute a based on the past T values of the attribute a.

The source selection module 104 is described, and may automatically select the next source(s) 102 for enrichment, given the data object 101. As discussed above, the sources 102 may include sources such as, for example, enterprise databases, structured and unstructured resources on the Web, and file systems. Selection of the best source to use next may consider, for example, the following two factors. First, selection of the best source may determine whether the source will be able to provide values if called, and secondly, whether the source may target unknown attributes in $D_u$ with high relevance. Thus the foregoing first factor may be based on reliability of a source in providing values if called, and the second factor may be based on the ability of a source to provide values that are useful.

The source selection module 104 may satisfy the first factor by measuring how well known values of the data object D match the inputs required by the source. For example, at the outset, the sources 102 may be registered with the system 100. Registration may include, for example, the number of inputs required by a source being specified, and the source further specifying the outputs that can be provided. For example, for a source such as LINKEDIN, since LINKEDIN advertises professional information, if the source requires an input of a name and e-mail contact to output an individual's occupation, and if the source is only provided with an individual's name, the module 104 may satisfy the first factor by measuring how well known values of the data object D match the inputs required by the source. Thus if there is a good match, then the source may more likely return values when it is called. The module 104 may also consider the number of times the source has been polled before to prevent "starvation" of other sources. The source selection module 104 may satisfy the second factor by measuring how many high-relevance, unknown attributes the source claims to provide. If a source claims to provide a large number of high-relevance, unknown attributes, then the module 104 may select the source over other sources. The second factor may serve as a selection bias.

The source selection module 104 may determine the foregoing first and second factors by the following equation:

$$F_s = \frac{1}{2^{M-1}} B_s \frac{\sum_{a \in D_k \cap I_s} k_{v(a)}}{|I_s|} + \frac{\sum_{a \in D_u \cap O_s} k_a}{|D_u|} \quad (3)$$

In Equation (3), $F_s$ may represent the fitness score of a source s being considered and $B_s$ may represent the base fitness score of a source s being considered. $B_s$ may be randomly set between 0.5 and 0.75 when the system 100 is initialized, and adapted as described below. In Equation (3), $I_s$ may represent the set of input attributes to the source, $O_s$ may represent the set of output attributes from the source, and M may represent the number of times the source has been selected in the context of enriching the current data object. The source with the highest score $F_s$ that also exceeds a predefined minimum threshold R may be selected as the next source to use for enrichment. The selection, and hence enrichment process may continue until either $D_u$ is empty or there are no sources whose score $F_s$ exceeds R. The threshold R may be set between 0 and 2, and based on the number of iterations used for enrichment. A threshold R set closer to 2 may thus result in only strong sources being selected, and a threshold R set closer to 0 may result in weaker sources being selected.

As described above, selection of the best source to use next may consider, for example, the following two factors. First, selection of the best source may determine whether the source will be able to provide values if called, and secondly, whether the source may target unknown attributes in $D_u$ with high relevance. For the first factor, for a source such as LINKEDIN, since LINKEDIN advertises professional information, providing the source a name and e-mail contact should result in an individual's occupation with a high degree of confidence. However, if the source was provided only a name, the source would be expected to provide an occupation with a lower degree of confidence, since various individuals may have the same name. Thus uncertainty in the input to the source may likewise translate to uncertainty in the output of the source. This uncertainty may be captured by the first half of Equation (3) above (i.e., the part left of the + sign), which may take the number of inputs and multiply them by the base fitness score $B_s$ and the half life $$\frac{1}{2^{M-1}}.$$

The half life aspect may prevent "starvation" of other sources. For example, if a source is called multiple times, the half life aspect may downgrade the usefulness of a source based on the number of times the source has been called. Thus the dominance of a source may be discounted each time it has been called to thus allow other sources to be called. The second half of Equation (3) above (i.e., the part to the right of the + sign) may account for whether a source targets unknown attributes in $D_u$ with high relevance. For example, if the foregoing data object D being a customer has three unknown attributes (e.g., e-mail contact, city and state), if a first source is capable of providing two of the three unknown attributes and a second source is capable of providing one of the three unknown attributes, the first source would be given preference.

The output value confidence module 105 is described, and may compute the confidence in the output value given by a source for an unknown attribute. For example, if a source provides multiple outputs for an input, the module 105 may determine the confidence of an output using the following equations:

$$k_{v(a')} = \begin{cases} e^{\lambda(k_{v(a')}-1)}, & \text{if } k_{v(a')} \neq \emptyset \\ e^{(\frac{1}{|V_{a'}|}-1)}W, & \text{if } k_{v(a')} = \emptyset \end{cases} \quad (4)$$

where, (5)

$$W = \frac{\sum_{a \in D_k \cap I_s} k_{v(a)}}{|I_s|}$$

For Equation (4), the confidence in the correctness of the value v(a') for an unknown attribute a' may be denoted $k_{v(a')}$. $V_a$, may represent the set of output values returned by a source for an unknown attribute a'. If multiple output values are returned, then the confidence in the output may be discounted due to the ambiguity. Equation (4) may also consider if an output value is corroborated by output values given by previously selected sources. If an output value is corroborated, then the confidence may be further increased. The $\lambda$ factor may represent the corroboration factor ($\lambda$<1.0), and may default to 1.0. For example, if a first high confidence source returns an occupation for an individual, if a second source returns multiple occupations, one of which is the occupation returned by the first high confidence source, the $\lambda$ factor may take into account corroboration by the two sources. For Equation (4), the first branch (e.g., $k_{v(a')} \neq \emptyset$) may be used if another source had previously provided a value for the particular unknown attribute a'. Similarly, the second branch (e.g., $k_{v(a')} = \emptyset$) may be used if no sources have previously provided a value for the particular unknown attribute a'. For Equation (5), W may account for confidence in a source output based on the number of inputs, in a similar manner as described above.

Once a source has been called, the source utility and adaptation module 106 may determine the utility of the source in enriching the data object of interest. The module 106 may model the utility of a source as a "contract". For example, if the module 106 provides a source with high confidence input values, then the source may be expected to provide values for all the output attributes that the source claims to target. Moreover, these values may not be generic and should have low ambiguity. If these expectations are violated, then the source may be penalized. On the other hand, if the module 106 does not provide a source with good inputs, then the source may be penalized minimally, if at all, if the source fails to provide any useful outputs. For example, for a source such as LINKEDIN, if LINKEDIN requires at least inputs of an individual's name, city and state to provide an occupation and title, if the source were indeed provided the three required inputs, then the source would be expected to return the claimed outputs. If the expected outputs are violated (e.g., the source returns incorrect information or fails to return information), then the source may be penalized. On the other hand, if the source were provided only two of the three required inputs (e.g., only an individual's name and state), then the source may be penalized minimally, if at all, if the source fails to provide any useful outputs.

The source utility and adaptation module 106 may account for the foregoing aspects using the following equations:

$$U_s = W\left(\frac{1}{|O_s|}\left(\sum_{a \in O_s^+} e^{\frac{1}{|V_a|}-1} k_a^{P_T v(a)} - \sum_{a \in O_s^-} k_a\right)\right) \quad (6)$$

where, (7)

$$P_T(v(a)) = \begin{cases} P_T(v(a)), & \text{if } |V_a| = 1 \\ \underset{v(a) \in V_a}{\operatorname{argmin}} P_T(v(a)), & \text{if } |V_a| > 1 \end{cases}$$

For Equation (6), $O_s^+$ may represent the output attribute from a source for which values were returned, $O_s^-$ may represent the output attributes from the same source for which values were not returned, and $P_T(v(a))$ may represent the relative frequency of a value v(a) for an attribute a over the past T values returned by the source. $|V_a|$ may represent the number of values of v(a). Thus the relative frequency of a value v(a) (i.e., $P_T(v(a))$) may be determined based on the number of values of v(a) out of the past T values returned by a source.

The utility of a source $U_s$ from the past n calls may then be used to adjust the base fitness score of the source. This adjustment may be determined using the following equation:

$$B_s = B_s + \gamma \frac{1}{n} \sum_{1}^{n} U_s(T-i) \qquad (8)$$

For Equation (8), $B_s$ may represent the base fitness score of a source s, $U_s(T-i)$ may represent the utility of the source i time steps back, $\gamma$ may represent the adjustment rate, and T may represent the current time step.

Thus referring to Equation (8), if over time a source returns values that are not reliable, the source may be penalized by changing the base fitness score $B_s$, which may be used in Equation (3) above to calculate the fitness score $F_s$ of a source s being considered. Based on Equation (8), the base fitness score $B_s$ may be evolved based on the utility of the source i time steps back (i.e., $U_s(T-i)$) and the adjustment rate $\gamma$, which may yield a negative result to thus lower the original base fitness score $B_s$ set for Equation (3) as described above. The adjustment rate $\gamma$ may range between 0 to 1, with values closer to 0 providing slower change in the original base fitness score $B_s$, and values closer to 1 providing faster adaptability to the original base fitness score $B_s$ of a source.

The ambiguity resolution module 107 is described, and may resolve ambiguities that may occur during the enrichment process, for example, when a source returns multiple values for an unknown attribute. For example, given the following customer data object:

(Name: JohnSmith, City: SanJose,Occupation: NULL), (9)

a source may return multiple values for the unknown attribute of occupation (e.g. programmer, artist, etc). In order to resolve this ambiguity, the ambiguity resolution module 107 may branch the original object, for example, one branch for each returned value, and each branched object may be subsequently enriched by the data enrichment system 100 as described above. Hence, a single data object may result in multiple objects at the conclusion of the enrichment process. The ambiguity resolution module 107 may then determine the fitness for each resulting object using the following equation:

$$\frac{\sum_{a \in D_k} k_{v(a)} k_a}{|D_k \cup D_u|} \qquad (10)$$

For Equation (10), the top M objects (e.g., top 3 out of 5 total objects returned) according to this fitness may be returned to a user.

Thus referring to Equation (10), the ambiguity resolution module 107 may multiply $k_a$ (i.e., the relevance of an attribute a to $D_k$, which includes attributes whose values are known) and $k_{v(a)}$ (i.e. the confidence in the correctness of v(a), which represents the value of the attribute a), and divide by the total number of known and unknown elements $D_k$ and $D_u$ of the data object D.

Figure 2:
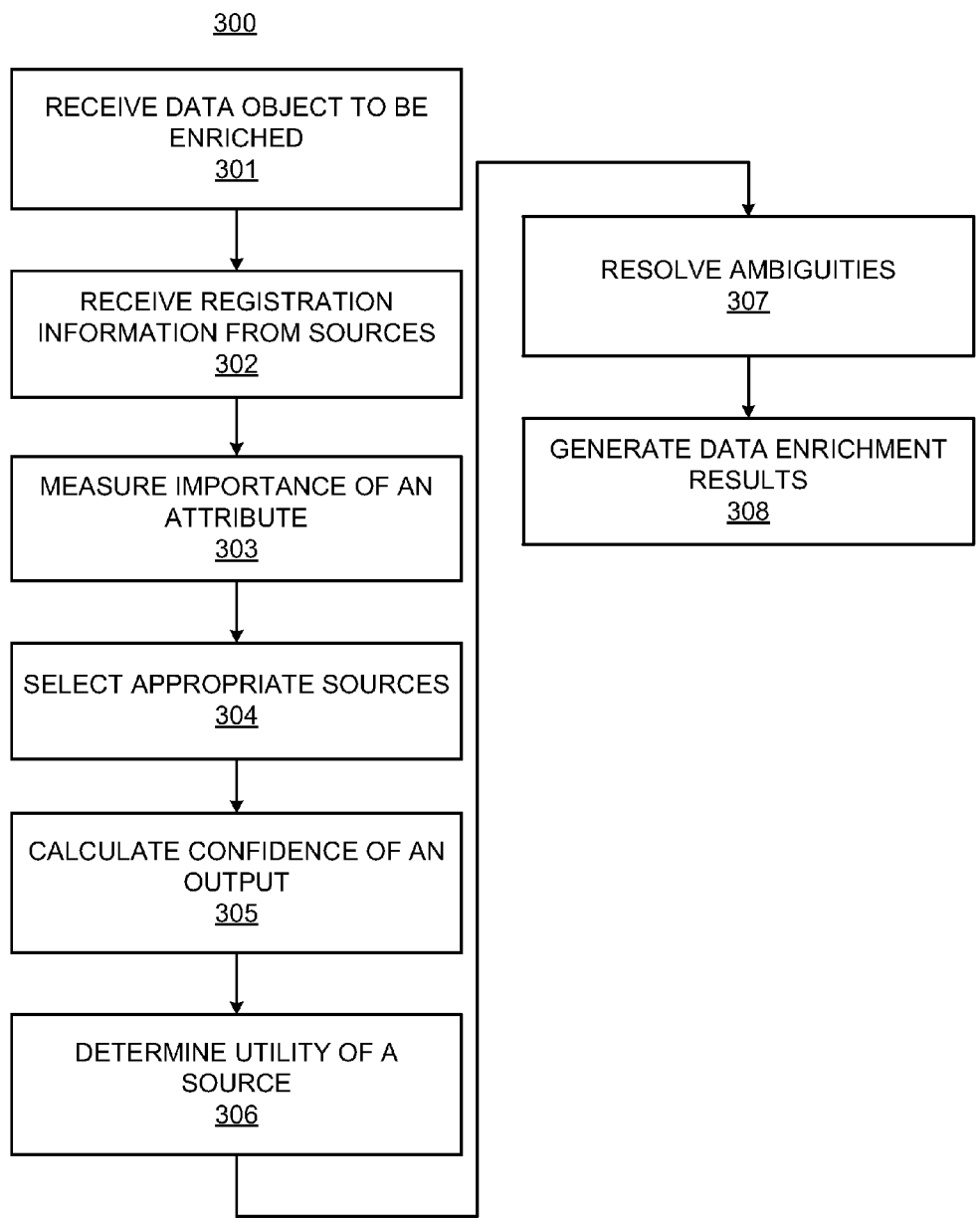
FIG. 2 illustrates a method for data enrichment, according to an embodiment.

FIG. 2 illustrates a flowchart of a method 300 for data enrichment, according to an embodiment. The method 300 may be implemented on the data enrichment system 100 described above with reference to FIG. 1 by way of example and not limitation. The method 300 may be practiced in other systems.

For the method 300, referring to FIGS. 1 and 2, at block 301, the data enrichment system 100 may receive the data object 101 that is to be enriched. As described above, the data object 101, also denoted data object D, to be enriched may include the elements $D_k$ and $D_u$. $D_k$ may include attributes whose values are known, which may be defined as $D_k = \{<a, v(a), k_a, k_{v(a)}> \ldots \}$. $D_u$ may include attributes whose values are unknown and hence the targets for enrichment by the system 100, and may be defined as $D_u = \{<a, k_a> \ldots \}$.

At block 302, the system 100 may receive registration information from the sources 102. As described above, the sources 102 may include sources such as, for example, enterprise databases, structured and unstructured resources on the Web, and file systems. Registration may include, for example, the number of inputs required by a source being specified, and the source further specifying the outputs that are provided.

At block 303, the attribute relevance module 103 may measure of the relevance of an attribute to a data object, and use the relevance to guide the selection of appropriate sources for enrichment by the source selection module 104. As described above, the relevance of an attribute may be based on a first premise that an attribute has high relevance to a data object if it is uniquely associated with the data object, and a second premise that an attribute has high relevance if it is highly discriminative with respect to instances of the data object.

At block 304, the source selection module 104 may automatically select the next source(s) 102 for enrichment, given the data object 101. As described above, selection of the best source to use next may consider, for example, the following two factors. First, selection of the best source may determine whether the source will be able to provide values if called, and secondly, whether the source may target unknown attributes in $D_u$ with high relevance. The source selection module 104 may satisfy the first factor by measuring how well known values of the data object D match the inputs required by the source. The module 104 may also consider the number of times the source has been polled before to prevent "starvation" of other sources. The source selection module 104 may satisfy the second factor by measuring how many high-relevance, unknown attributes the source claims to provide. If a source claims to provide a large number of high-relevance, unknown attributes, then the module 104 may select the source over other sources. The second factor may serve as a selection bias.

At block 305, the output value confidence module 105 may calculate the confidence in an output value provided by a source for an unknown attribute. For example, as described above, if a source provides multiple outputs for an input, the module 105 may determine the confidence of such outputs.

At block 306, the source utility and adaptation module 106 may determine the utility of a source that has been called in enriching the data object of interest. As described above, the module 106 may model the utility of a source as a "contract". For example, if the module 106 provides a source with high confidence input values, then the source may be expected to provide values for all the output attributes that the source claims to target. If these expectations are violated, then the source may be penalized. On the other hand, if the module 106 does not provide a source with good inputs, then the source may be penalized minimally, if at all, if the source fails to provide any useful outputs.

At block 307, the ambiguity resolution module 107 may resolve any ambiguities that may occur during the enrichment process, when a source returns multiple values for an unknown attribute. As described above, in order to resolve this ambiguity, the ambiguity resolution module 107 may branch the original object, for example, one branch for each returned value, and each branched object may be subsequently enriched by the data enrichment system 100 as described above. Hence, a single data object may result in multiple objects at the conclusion of the enrichment process. The ambiguity resolution module 107 may then determine the fitness for each resulting object and return the top M objects according to this fitness.

At block 308, results generated by the modules 103-107 may be generated by the system 100 as data enrichment results 109. The data enrichment results 109 may also be generated at various intermediate stages by the modules 103-107 as described above.

Figure 3:
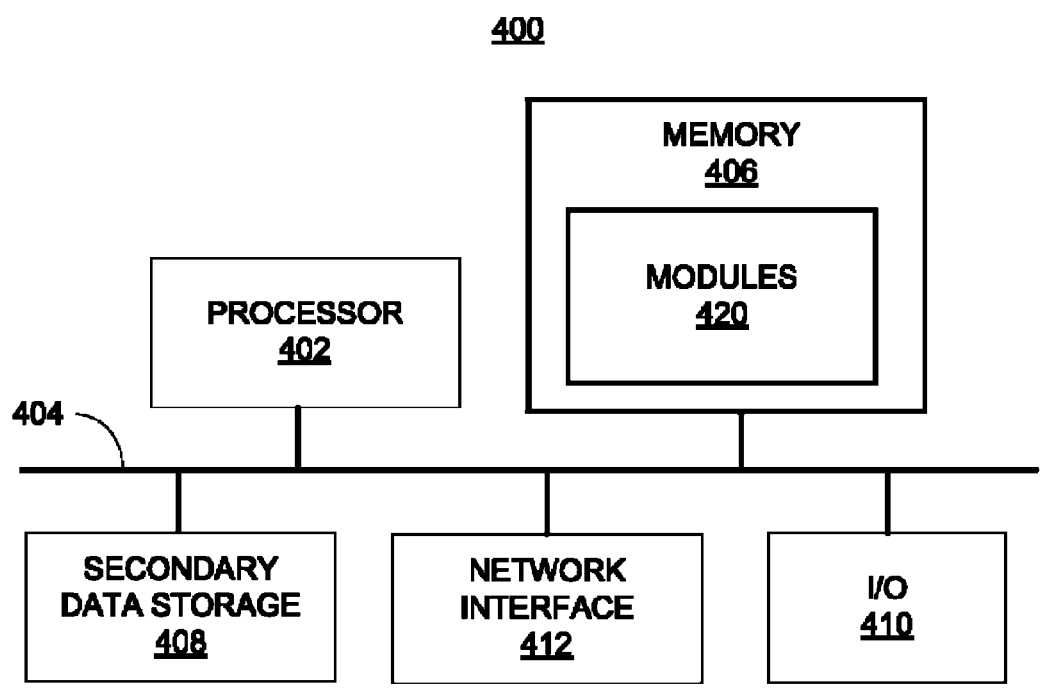
FIG. 3 illustrates a computer system, according to an embodiment.

FIG. 3 shows a computer system 400 that may be used with the embodiments described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules 103-107 of the system 100 shown in FIG. 1.

The computer system 400 may include an I/O device 410, such as a keyboard, a mouse, a display, etc. The computer system 400 may include a network interface 412 for connecting to a network. Other known electronic components may be added or substituted in the computer system 400.

While the embodiments have been described with reference to examples, various modifications to the described embodiments may be made without departing from the scope of the claimed embodiments.

What is claimed is:

1. A data enrichment system comprising:
an attribute relevance module, executed by at least one hardware processor, to measure relevance of an attribute to a data object to be enriched, the data object including the attribute including one of a known and an unknown value, wherein the relevance of the attribute includes a determination of a unique association of the attribute with the data object, and a determination of a discriminative property of the attribute with respect to instances of the data object based on evaluation of an entropy of a predetermined number of past values of the attribute; and
an output value confidence module, executed by the at least one hardware processor, to determine a confidence of a source based on utility of an output value of the source used for enrichment of the data object, the output value representing at least one of the known and unknown values of the attribute,
wherein the system uses the measured relevance of the attribute and the determined confidence of the source to determine assignment of the unknown value to the attribute.

2. A method for data enrichment, the method comprising:
measuring, by an attribute relevance module that is executed by at least one hardware processor, relevance of an attribute to a data object to be enriched, the data object including the attribute including one of a known and an unknown value, wherein the relevance of the attribute includes a determination of a unique association of the attribute with the data object, and a determination of a discriminative property of the attribute with respect to instances of the data object based on evaluation of an entropy of a predetermined number of past values of the attribute;
determining, by an output value confidence module that is executed by the at least one hardware processor, a confidence of a source based on utility of an output value of the source used for enrichment of the data object, the output value representing at least one of the known and unknown values of the attribute;
determining, by the at least one hardware processor, assignment of the unknown value to the attribute by using the measured relevance of the attribute and the determined confidence of the source; and
determining, by a source utility and adaptation module that is executed by the at least one hardware processor, utility of the source for enrichment of the data object by determining a confidence of input values provided to the source.

3. A non-transitory computer readable medium having stored thereon machine readable instructions to provide data enrichment, the machine readable instructions, when executed, cause at least one hardware processor to:
measure, by an attribute relevance module, relevance of an attribute to a data object to be enriched, the data object including the attribute including one of a known and an unknown value;
select, by a source selection module, a source for enrichment of the data object from a plurality of sources by at least one of
determining whether the source includes a fitness score that exceeds a predetermined threshold, and determining the fitness score based on input attributes to the source, output attributes from the source, and a number of times the source is selected for enrichment of the data object,
accounting for an uncertainty in an input to the source and an uncertainty in an output from the source, and
using a half-life factor to downgrade usefulness of the source based on a number of times the source is called;

determine, by an output value confidence module, a confidence of the source based on utility of an output value of the source used for enrichment of the data object, the output value representing at least one of the known and unknown values of the attribute;

determine assignment of the unknown value to the attribute by using the measured relevance of the attribute and the determined confidence of the source; and resolve, by an ambiguity resolution module, ambiguities in a plurality of output values that are generated by the source used for enrichment of the data object based on generation of a plurality of enriched data objects based on each of the plurality of output values that are generated by the source.

4. The non-transitory computer readable medium according to claim 3, wherein the relevance of the attribute includes:

a determination of a discriminative property of the attribute with respect to instances of the data object based on evaluation of an entropy of a predetermined number of past values of the attribute.

5. The system of claim 1, further comprising:

a source selection module, executed by the at least one hardware processor, to select the source for enrichment of the data object from a plurality of sources by determining that the selected source can provide a value for the attribute.

6. The system of claim 1, further comprising:

a source selection module, executed by the at least one hardware processor, to select the source for enrichment of the data object from a plurality of sources by determining that the selected source targets unknown attributes of the data object with high relevance.

7. The system of claim 1, further comprising:

a source utility and adaptation module, executed by the at least one hardware processor, to determine utility of the source for enrichment of the data object based on a determination of a confidence of input values provided to the source.

8. The system of claim 1, further comprising:

an ambiguity resolution module, executed by the at least one hardware processor, to resolve ambiguities in a plurality of output values that are generated by the source used for enrichment of the data object based on generation of a plurality of enriched data objects based on each of the plurality of output values that are generated by the source.

9. The system of claim 1, wherein the relevance of the attribute includes:

the determination of the unique association of the attribute with the data object based on evaluation of a relative frequency of data objects that do not have the attribute, and a relative frequency of data objects that have the attribute.

10. The system of claim 1, further comprising:

a source selection module, executed by the at least one hardware processor, to select the source for enrichment of the data object from a plurality of sources by determining that the source includes a fitness score that exceeds a predetermined threshold, and determining the fitness score based on input attributes to the source, output attributes from the source, and a number of times the source is selected for enrichment of the data object.

11. The system of claim 1, further comprising:

a source selection module, executed by the at least one hardware processor, to select the source for enrichment of the data object from a plurality of sources by accounting for an uncertainty in an input to the source and an uncertainty in an output from the source.

12. The system of claim 1, further comprising:

a source selection module, executed by the at least one hardware processor, to select the source for enrichment of the data object from a plurality of sources by using a half-life factor to downgrade usefulness of the source based on a number of times the source is called.

13. The method of claim 2, wherein measuring relevance of the attribute further comprises:

determining the unique association of the attribute with the data object based on evaluation of a relative frequency of data objects that do not have the attribute, and a relative frequency of data objects that have the attribute.

14. The method of claim 2, further comprising:

selecting, by a source selection module that is executed by the at least one hardware processor, the source for enrichment of the data object from a plurality of sources by determining that the selected source can provide a value for the attribute.

15. The method of claim 2, further comprising:

selecting, by a source selection module that is executed by the at least one hardware processor, the source for enrichment of the data object from a plurality of sources by determining that the selected source targets unknown attributes of the data object with high relevance.

16. The method of claim 2, further comprising:

resolving, by an ambiguity resolution module that is executed by the at least one hardware processor, ambiguities in a plurality of output values that are generated by the source used for enrichment of the data object.

17. The method of claim 2, further comprising:

selecting, by a source selection module that is executed by the at least one hardware processor, the source for enrichment of the data object from a plurality of sources by determining that the source includes a fitness score that exceeds a predetermined threshold, and determining the fitness score based on input attributes to the source, output attributes from the source, and a number of times the source is selected for enrichment of the data object.

18. The method of claim 2, further comprising:

selecting, by a source selection module that is executed by the at least one hardware processor, the source for enrichment of the data object from a plurality of sources by accounting for an uncertainty in an input to the source and an uncertainty in an output from the source.

19. The method of claim 2, further comprising:

selecting, by a source selection module that is executed by the at least one hardware processor, the source for enrichment of the data object from a plurality of sources by using a half-life factor to downgrade usefulness of the source based on a number of times the source is called.

20. The non-transitory computer readable medium according to claim 3, wherein the machine readable instructions, when executed, further cause the at least one hardware processor to:

select, by the source selection module, the source for enrichment of the data object from a plurality of sources by determining that the selected source targets unknown attributes of the data object with high relevance.

* * * * *